United States Patent [19]

Hoffman

[11] Patent Number: 5,894,677
[45] Date of Patent: Apr. 20, 1999

[54] MEASURING DEVICE

[76] Inventor: William W. Hoffman, 460 Langdale Ct., King of Prussia, Pa. 19406-1648

[21] Appl. No.: 08/676,497

[22] Filed: Jul. 8, 1996

[51] Int. Cl.⁶ .................................................. G01B 3/10
[52] U.S. Cl. .............................. 33/758; 33/755; 33/759
[58] Field of Search .............................. 33/758, 755, 757, 33/768, 770, 759, 494, 679.1

[56] References Cited

U.S. PATENT DOCUMENTS

| | | | |
|---|---|---|---|
| 1,303,756 | 5/1919 | Ballou | 33/758 |
| 1,469,944 | 10/1923 | Merrill | 33/494 |
| 1,976,861 | 10/1934 | Tombal | 33/494 |
| 1,994,339 | 3/1935 | Farrand | 33/768 |
| 2,574,272 | 11/1951 | McCully | 33/770 |
| 4,574,486 | 3/1986 | Drechsler | 33/755 |
| 5,291,664 | 3/1994 | Pinney, Jr. et al. | 33/768 |
| 5,295,308 | 3/1994 | Stevens et al. | 33/768 |
| 5,335,421 | 8/1994 | Jones, Jr. | 33/494 |

FOREIGN PATENT DOCUMENTS

| | | | |
|---|---|---|---|
| 120902 | 7/1984 | Japan | 33/758 |
| 155903 | 8/1985 | Japan | 33/758 |
| 2233097 | 1/1991 | United Kingdom | 33/755 |

*Primary Examiner*—Christopher W. Fulton
*Attorney, Agent, or Firm*—John F. A. Earley; John F. A. Earley, III; Harding, Earley, Follmer & Frailey

[57] ABSTRACT

A measuring tape for measuring the distance between a first point and a second point. The tape has a flexible elongated blade with a tab fixed to free end of the blade for temporarily and removably hooking the free end of the blade to the first point. The tab extends in at least two directions transverse to a lengthwise edge of the blade at the free end of the blade. The blade has two sets of numbers imprinted thereon which correspond to units of measure. The first set of numbers is imprinted along a first lengthwise edge portion of the blade and is positioned on the blade such that the numbers are arranged in upright position one after the other and increase in value when read from the free end of the blade toward the fixed end of the blade. The second set of numbers is imprinted along a second lengthwise edge portion of the blade and is positioned on the blade such that the numbers are arranged in upside-down position one after the other, relative to the first set of numbers, and increase in value when read from the free end of the blade toward the fixed end of the blade, resulting in one of the sets of numbers being legible right-side-up whether the free end of the blade is positioned at the first point or the second point.

5 Claims, 3 Drawing Sheets

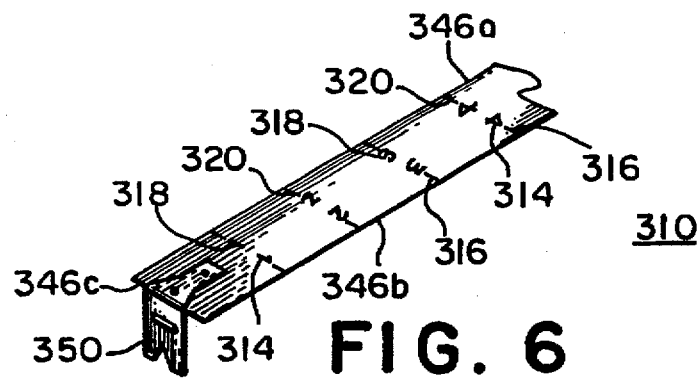
FIG. 6
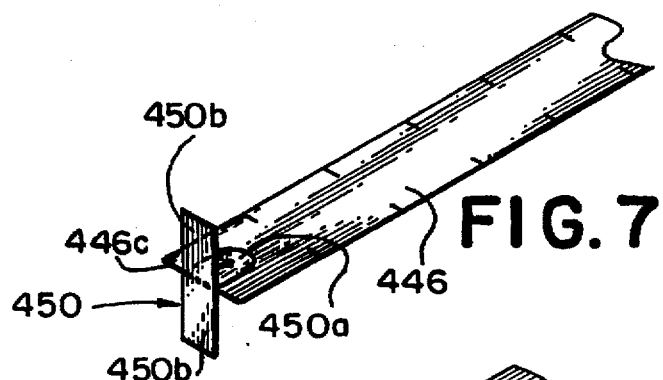
FIG. 7
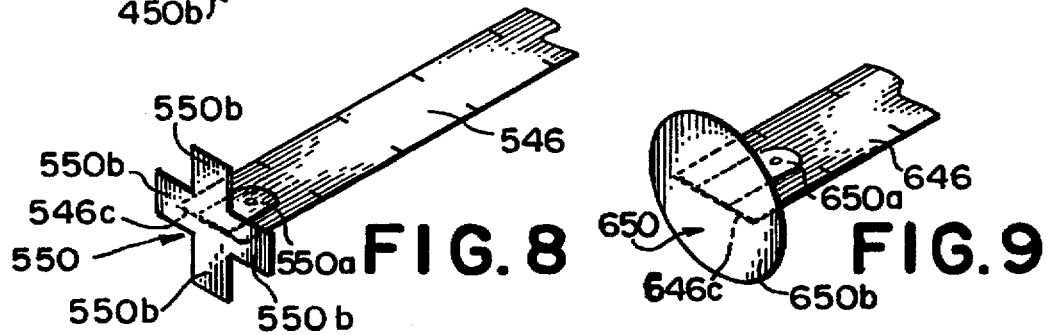
FIG. 8
FIG. 9
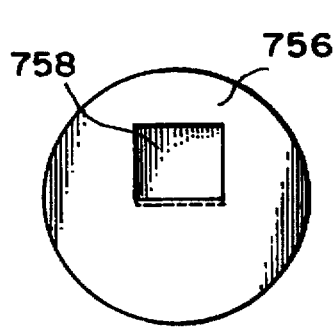
FIG. 11
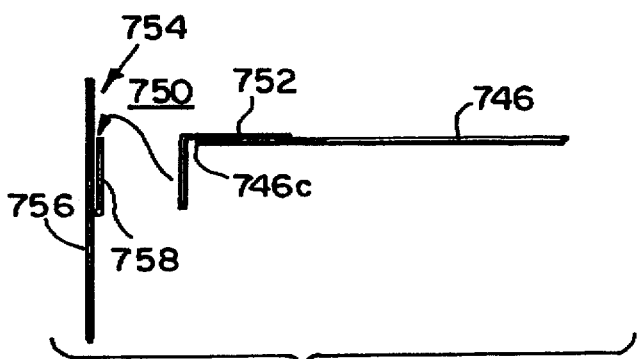
FIG. 10

MEASURING DEVICE

FIELD OF THE INVENTION

The invention relates to measuring devices, and more particularly concerns measuring devices such as straight rulers, measuring tapes, yard sticks, and carpenter rulers.

BACKGROUND OF THE INVENTION

Straight rulers, measuring tapes, yard sticks and carpenter rulers are examples of several well known measuring devices. Each of the aforementioned measuring devices has numbers imprinted thereon which correspond to units of measure. The set of numbers is usually imprinted on the measuring device such that the numbers are arranged in upright position one after the other and increase in value starting from the first end of the measuring device.

Many measuring devices are also provided with a second set of numbers imprinted thereon. The second set of numbers usually provides a measurement scale different than the first set of numbers. On such devices, the two sets of numbers are imprinted in upside-down orientation relative to each other along opposed lengthwise edges of the device. Each set of numbers ascends in value starting at opposed ends of the measuring device, respectively. A prior art measuring device having two sets of numbers as described above is illustrated in FIG. 1.

Prior art measuring devices such as those illustrated by the device shown in FIG. 1 are designed to measure the distance between a first point (e.g., the point being measured from) and a second point (e.g., the point being measured to) by positioning the first end of the measuring device at the first point, extending the measuring device to the second point, and determining from the measurement indicia on the measuring device the distance between the first point and the second point. In order to read the measurement right-side-up, the first end of the measuring device must be positioned to the left of the point being measured to. If the first end of the measuring device is positioned to the right of the point being measured to, prior art measuring devices such as those illustrated by the device shown in FIG. 1 must be turned upside-down. As a result, the user must read the measurement upside-down as well. This can be troublesome to the user and cause inaccurate measurements.

Prior art measuring devices have another significant problem. Prior art measuring tapes, such as those illustrated by the measuring tape shown in FIG. 2, are provided with an "L-shaped" metal hook attached to the free end of the blade of the tape measure for removably hooking the free end to the point being measured from. Since the "L-shaped" tab extends in only one direction transverse to the surface of the measuring tape, the measuring tape is often oriented in an awkward or unreadable position. For example, to measure the underside of an object, the measuring tape must be turned over in order for the tab to hook the underside edge of the object. In this position, only the blank, reverse side of the tape is exposed.

SUMMARY OF THE INVENTION

It is an object of the present invention to provide a measuring device which may be used to measure the distance between a first point and a second point without the necessity of reading an upside-down measurement indicia (e.g., an upside-down number).

It is a further object of the present invention to provide a measuring device having two sets of measurement indicia (e.g., two sets of numbers) wherein one set of numbers is legible right-side-up whether measuring from right to left (e.g., when the point being measured from is located to the right of the point being measured to) or whether measuring from left to right (e.g., when the point being measured from is located to the left of the point being measured to).

It is yet a further object of the present invention to provide a measuring device having a tab fixed to the free end of the blade of the measuring device, the tab extending in at least two directions traverse to the lengthwise edge of the blade of the measuring device at the free end of the blade.

These and other objects are accomplished by the measuring device of the invention which may be used to measure the distance between a first point (e.g., the point being measured from) and a second point (e.g., the point being measured to) without the necessity of reading the measurement indicia upside-down. Preferably, the measuring device has two sets of numbers imprinted thereon wherein one set of numbers is legible right-side-up whether measuring from right to left (e.g., when the point being measured from is located to the right of the point being measured to) or whether measuring from left to right (e.g., when the point being measured from is located to the left of the point being measured to).

The measuring device comprises a rule for measuring the distance from a first point to a second point. The rule comprises a base having a reference end which in use is aligned with the point being measured from and an opposed end, said base comprising an elongated rectangular-shaped flat material. The base has two sets of numbers imprinted thereon which correspond to units of measure. The first set of numbers is imprinted along a first lengthwise edge of the base and positioned on the base such that the numbers are arranged in an upright position one after the other and increase in value when read from the reference end of the ruler toward the opposed end. The second set of numbers is imprinted along a second lengthwise edge of the base and positioned on the base such that the numbers are arranged one after the other in upside-down position, relative to the first set of numbers, and increase in value when read from the reference end of the ruler toward the opposed end. As a result, one set of numbers is legible right-side-up whether measuring from right to left (e.g., when the point being measured from is located to the right of the point being measured to) or whether measuring from left to right (e.g., when the point being measured from is located to the left of the point being measured to).

The measuring device also comprises a measuring tape for measuring the distance from a first point to a second point. The measuring tape comprises a housing having a blade outlet and a blade hub centrally located inside the housing. The measuring tape has a flexible, elongated blade having one end connected to the blade hub and coiled into a roll around the blade hub. The blade also has a free end extending from the housing through the blade outlet. The blade has two sets of numbers imprinted thereon which correspond to units of measure. The first set of numbers is imprinted along a first lengthwise edge portion of the blade and positioned on the blade such that the numbers are arranged in upright position one after the other and increase in value when read from the free end toward the fixed end. The second set of numbers is imprinted along a second lengthwise edge portion of the blade and positioned on the blade such that the numbers are arranged in upside-down position one after the other, relative to the first set of numbers, and increase in value when read from the free end toward the fixed end. A tab is fixed to the reference end of the blade for temporarily and removably hooking the free end to the point being measured from, said tab extending in at least two directions transverse to a lengthwise edge of the blade at the free end of the blade. As a result, one of said sets of numbers is legible right-side-up whether measuring from right to left (e.g., when the point being measured from is located to the right of the point being measured to) or whether measuring from left to right (e.g., when the point being measured from is located to the left of the point being measured to).

The measuring tape may also include a tab fixed to the free end of the blade, wherein the tab comprises a base fixed to the free end of the blade and an extension removably connected to the base. The extension has a slot into which the base is inserted for removable interconnection therewith. The extension extends in at least two directions transverse to the surface of the blade.

BRIEF DESCRIPTION OF THE DRAWINGS

FIG. 6 is a fragmentary perspective view of the end of a measuring tape having two measurement scales imprinted thereon in accordance with an embodiment of the invention;

FIG. 7 is a fragmentary perspective view of the reference end of a measuring tape in accordance with an embodiment of the invention;

FIG. 8 is a fragmentary perspective view of the reference end of a measuring tape in accordance with an embodiment of the invention;

FIG. 9 is a fragmentary perspective view of the reference end of a measuring tape in accordance with an embodiment of the invention;

FIG. 10 is a fragmentary view in side elevation of the reference end portion of a measuring tape in accordance with an embodiment of the invention;

FIG. 11 is a view in rear elevation of the extension portion of a tab in accordance with an embodiment of the invention; and, FIG. 12 is a top plan view of a ruler constructed in accordance with another embodiment of the invention.

DETAILED DESCRIPTION OF THE DRAWINGS

Figure 3:
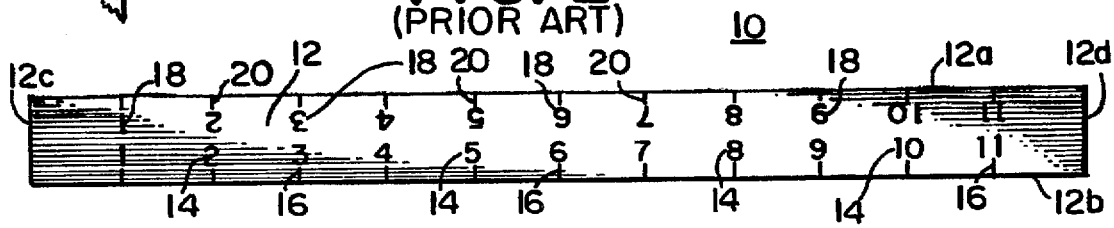
FIG. 3 is a top plan view of a rule having two measurement scales imprinted thereon in accordance with an embodiment of the invention.

A measuring device according to an embodiment of the invention is illustrated in FIG. 3. The measuring rule 10 comprises a elongated, rectangular-shaped base 12 made of flat, rigid material such as wood, metal or plastic. The base 12 may be provided in standard lengths such as 12 inches, 18 inches, 36 inches or 48 inches, or any other desired length. One end of the base 12 is a reference end 12c from which measurements are calculated.

The base 12 has two sets of numbers and indicator lines imprinted thereon which correspond to units of measure. The units of measure may be either standard or metric. The first set of numbers 14 and indicator lines 16 are imprinted along the bottom, lengthwise edge 12b of the base 12. The bottom edge 12b is described with reference to FIG. 3. However, as described below, either lengthwise edge may be defined as the bottom edge since the base is symmetrical about its lengthwise axis.

The numbers in the first set 14 are arranged in an upright orientation relative to the bottom edge 12b. In other words, the base of the numbers in the first set 14 is proximal the bottom edge 12b compared to the apex of the numbers. The numbers in the first set 14 sequentially increase in value from the reference end 12c of the base 12 to the other end 12d of the base 12.

The second set of numbers 18 and indicator lines 20 are imprinted along the top, lengthwise edge 12a of the base 12. The top edge 12a is described with reference to FIG. 3. However, as described below, either lengthwise edge may be define as the top edge since the base is symmetrical about its lengthwise axis.

The numbers in the second set 18 are arranged in a right-side-up orientation relative to the top edge 12a. In other words, the base of the numbers in the second set 18 is proximal the top edge 12a compared to the apex of the numbers. The numbers in the second set 18 also sequentially increase in value from the reference end 12c of the base 12 to the other end 12d of the base 12.

The first and second sets of numbers are arranged in a right-side-up orientation relative to the bottom 12b and top 12a edges of the base, respectively. Further, the first and second sets of numbers are arranged in an upside-down relation relative to each other. However, both the first and second set of numbers begin at and sequentially increase in value from a common or reference end 12c of the base 12. Therefore, one set of numbers which sequentially originates from the reference end 12c is always legible right-side-up whether the reference end is positioned to the left or to the right of an object or point which is to be measured to. Prior art measuring rulers do not provide this function. For example, referring to the prior art ruler in FIG. 1, the numbers are oriented right-side-up only when measuring from left to right, that is, only when measuring to a point that is to the right of the point being measured from.

Figure 4:
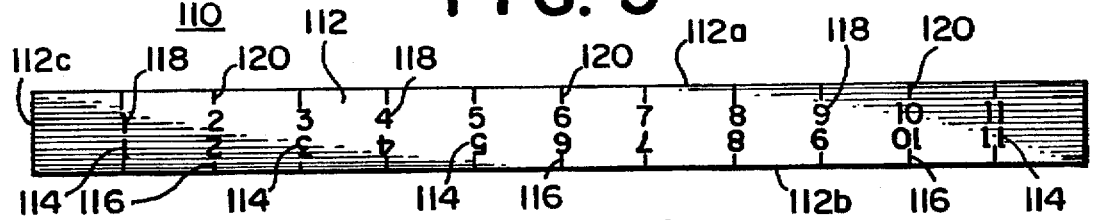
FIG. 4 is a top plan view of a rule having two measurement scales imprinted thereon in accordance with an embodiment of the invention.

The measuring rule in FIG. 3 illustrates an embodiment in which the bottom edge 12b is the preferred edge from which to take a measurement. A measuring device according to an further embodiment of the invention is illustrated in FIG. 4 in which the top edge 112a is the preferred edge from which to take a measurement. The measuring device 110 is similar to the measuring device 10 described above except that the numbers in the first set 114 and the second set 118 are arranged in an upside-down orientation relative to the bottom edge 112b and top edge 112a of the base 112, respectively.

Figure 5:
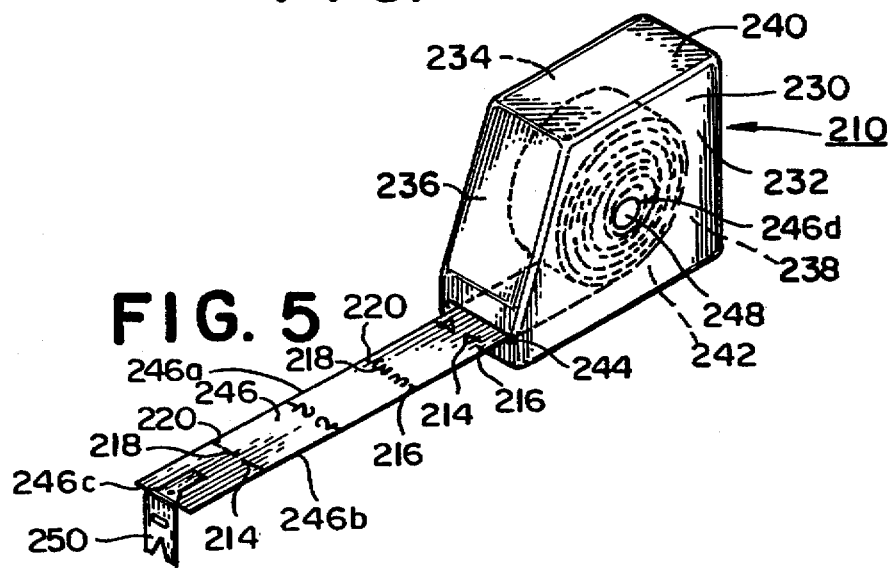
FIG. 5 is a perspective view of a measuring tape having two measurement scales imprinted thereon in accordance with an embodiment of the invention.

A measuring device according to an further embodiment of the invention is illustrated in FIGS. 5 and 6. The measuring tape 210 comprises a housing 230 having opposed side walls 232, 234 opposed front and back walls 236, 238 and opposed top and bottom walls 240, 242. The housing has a tape outlet 244 on the front wall 236 out of which a flexible measuring blade may be extended.

The measuring tape 210 includes a measuring blade 246 comprising a flexible, coilable metallic strip. A fixed end 246d of the measuring blade 246 is fixed to and coiled into a roll around a tape hub 248 centrally located inside the housing 230. A free end or reference end 246c of the blade 246 extends through the tape outlet 244. The reference end 246c of the blade 246 has a tab 250 fixed thereto for temporarily and removably hooking the reference end 246c to a reference point or object. Referring to FIG. 5, the tab 250 comprises an "L-shaped" metallic hook extending in a downward direction perpendicular to the surface of the blade 246. The tab 250 also prevents the reference end 246c of the blade 246 from being retracted into the interior of the housing 230.

Similar to the measuring rule 10 described above, the measuring blade has two sets of numbers and indicator lines imprinted thereon which correspond to units of measure. The units of measure may be either standard or metric. The first set of numbers 214 and indicator lines 216 are imprinted along a first lengthwise edge 246b of the blade 246. The numbers in the first set 214 are arranged in an upright orientation relative to the first edge 246b. In other words, the base of the numbers in the first set 214 is proximal the first edge 246b compared to the apex of the numbers. The numbers in the first set 214 sequentially increase in value from the reference end 246c of the blade 246 to the fixed end 246d of the blade 246.

The second set of numbers 218 and indicator lines 220 are imprinted along a second opposed edge 246a of the blade 246. The numbers in the second set 218 are arranged in a right-side-up orientation relative to the second edge 246a. In other words, the base of the numbers in the second set 218 is proximal the second edge 246a compared to the apex of the numbers. The numbers in the second set 218 sequentially increase in value from the reference end 246c of the blade 246 to the fixed end 246d of the blade 246.

The first and second sets of numbers are arranged in a right-side-up orientation relative to the first 246b and second 246a edges of the blade, respectively.

Further, the first and second sets of numbers are arranged in an upside-down relation relative to each other. However, both the first and second sets of numbers begin at and sequentially increase in value from the same reference end 246c of the blade 246. Therefore, one set of numbers which sequentially originates from the reference end is always legible right-side-up whether the reference end is positioned to the left or to the right of an object or point which is to be measured to.

The measuring tape of FIG. 5 illustrates an embodiment in which the first edge 246b is the preferred edge from which to take a measurement. In a measuring device according to an further embodiment of the invention illustrated in FIG. 6, the second edge 346a of the measuring device 310 is the preferred edge from which to take a measurement. FIG. 6 illustrates the reference end portion of the blade 346 according to this embodiment of the invention. The measuring device 310 is similar to the measuring device 210 described above except that the numbers in the first set 314 and the second set 318 are arranged in an upside-down orientation relative to the first 346b and second edge 346a of the blade 346, respectively.

Additional embodiments of the inventive measuring tape are illustrated in FIGS. 7, 8, and 9 in which a tab is provided on the reference end which extends in at least two directions traverse to the surface of the blade. Referring to FIG. 7, the tab 450 comprises a "T-shaped" tab having a bracket portion 450a fixed to and coplanar with the reference end 446c of the blade 446, and a hook portion 450b extending upwardly and downwardly transverse to the surface of said blade 446.

Referring to FIG. 8, the tab 550 has a bracket portion 550a fixed to and coplanar with the reference end 546c of said blade and has an "X-shaped" hook portion 550b attached to the end of the bracket portion 550a. The hook portion 550b extends upwardly, downwardly, and widthwise transverse to the surface of said blade 546.

Referring to FIG. 9, the tab 650 has a bracket portion 650a fixed to and coplanar with the reference end 646c of the blade 646, and has a circular disc-shaped hook portion 650b attached to the end of the bracket portion 650a. The hook portion 650b extends radially 360 degrees transverse to the surface of the blade 646.

The invention comprises further embodiments of the measuring tape illustrated in FIGS. 5 and 6 having an interchangeable tab fixed to the reference end. A portion of the blade according to this embodiment of the invention is illustrated in FIGS. 10 and 11. Referring to FIG. 10, the tab 750 comprises a base 752 fixed to the reference end 746c of the blade and an extension 754 removably connected to the base 752. In the embodiment illustrated in FIG. 10, the base comprises an "L-shaped" metallic hook extending in a downward direction transverse to the surface of the blade 746. The extension 756 comprises a circular disc, preferably made of metal or plastic, extending radially 360 degrees transverse to the surface of the blade 746. The extension 756 has a slot 758 into which a portion of the base is inserted for removable interconnection therewith. Alternatively, the extension 756 may have an "X" shape as illustrated in FIG. 8, a rectangular shape as illustrated in FIG. 7, or any other practical shape whereby the extension extends in at least two directions traverse to the surface of the blade.

Figure 1:
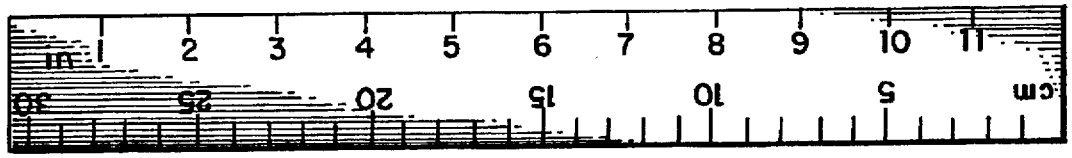
FIG. 1 is a top plan view of a prior art ruler having two measurement scales.
Figure 2:
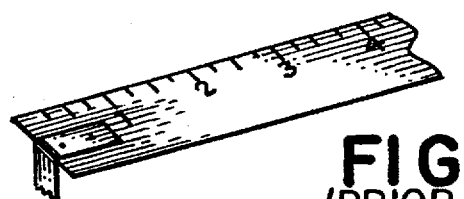
FIG. 2 is a fragmentary perspective view of the end of a prior art measuring tape.
Figure 12:
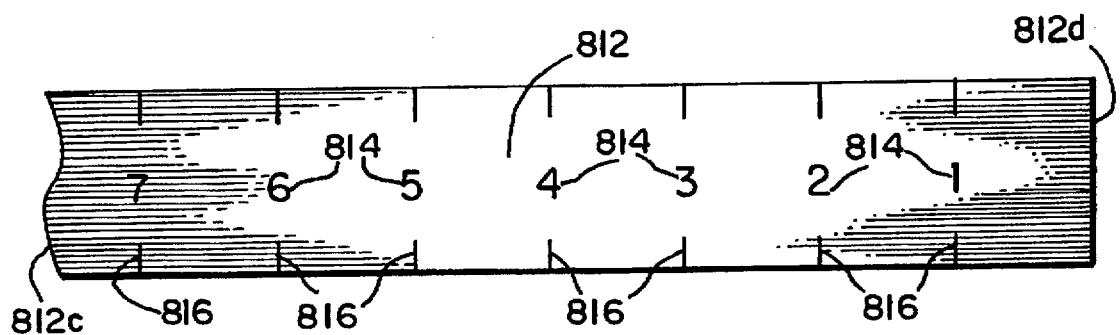

A further embodiment of the invention is illustrated in FIG. 12. In this embodiment, a ruler 812 such as the ruler shown in FIGS. 1, 3, and 4 is provided, with the exception that a set 814 of numbers, together with indicator lines 816 are imprinted on the base such that the numbers are arranged in a right-side-up orientation when read from the right edge 812d to the left edge 812c. This embodiment of the invention facilitates measuring from a first point to a point to be measured to that is to the left of the first point since the measurement may be read by viewing numbers that are oriented right-side-up.

Figure 13:
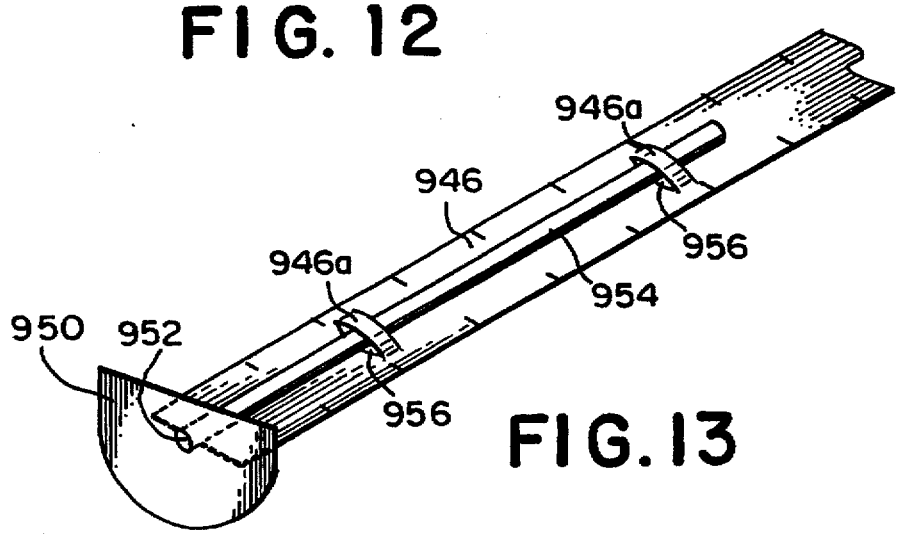
FIG. 13 is a fragmentary perspective view of the reference end of a measuring tape in accordance with an embodiment of the invention.
Figure 14:
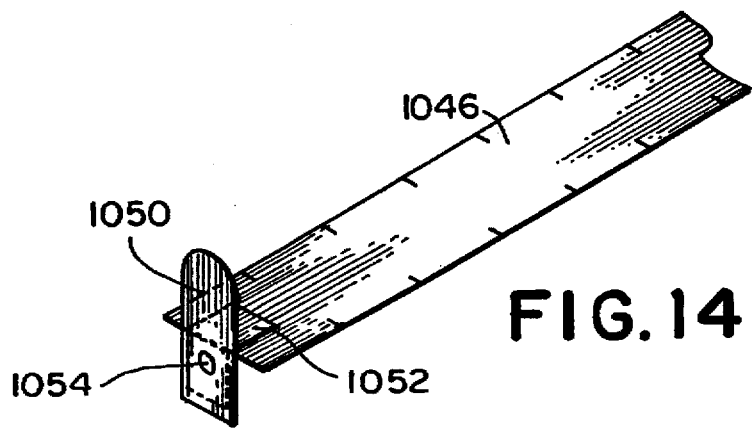
FIG. 14 is a fragmentary perspective view of the reference end of a measuring tape in accordance with an embodiment of the invention.

Additional embodiments of the inventive measuring tape are illustrated in FIGS. 13 and 14 in which a rotatable tab is provided on the reference end of the blade. The measuring tape according to these embodiments may have the same numbers and indicator lines imprinted thereon as described above.

Referring to FIG. 13, the rotatable tab 950 comprises a semi-circular disc, preferably made of metal or plastic. The rotatable tab 950 is rotatably fastened with a pivot fastener 952 to a pivot pin 954. Preferably, the pivot fastener 952 is fastened near the diametrical edge of the rotatable tab 950 such that the radial portion of the rotatable tab 950 may be positioned to extend 360 degrees transverse to the surface of the blade 946 upon rotation of the rotatable tab 950 relative to the pivot pin 954. Alternatively, the tab 950 may comprise various other shapes. However, whichever shape is selected, it is preferred that the rotatable tab 950 be fastened to the pivot pin 954 near the midpoint of one edge of the rotatable tab 950.

The pivot pin 954 is preferably attached to the end of the blade 946 in the manner illustrated in FIG. 13. Referring to FIG. 13, fastening strips 946a are punched out of the blade generally perpendicular to the lengthwise edge of the blade. The pivot pin 954 is then inserted through the clearance 956 created between the fastening strips 946a and the blade 946. The fastening strips 946a are then crimped at one or more locations to secure the pivot pin 954 to the surface of the blade 946.

A further embodiment of the invention having a rotatable tab is illustrated in FIG. 12. In this embodiment, a base 1052 is fixed to the reference end of the blade. The base comprises an "L-shaped" metallic or plastic hook extending in a downward direction transverse to the surface of the blade 1046. A rotatable tab 1050 is rotatably fastened by a pivot fastener 1054 to the portion of the base 1052 extending in a downward direction transverse to the surface of the blade 1046. Preferably, the pivot fastener 1054 comprises a rivet. The rotatable tab 1050 may be positioned to extend 360 degree transverse to the surface of the blade upon rotation of the rotatable tab 1050 relative to the pivot fastener 1054.

In a further embodiment of the invention, the ruler or tape described above may have numbers and indicator lines as described above imprinted on both sides of the ruler or tape.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention.

I claim:

1. A measuring tape for measuring the distance between a first point and a second point consisting essentially of a housing having a blade outlet and a blade hub centrally located inside said housing, a flexible elongated blade having one fixed end connected to said blade hub and coiled into a roll around the blade hub, and having a free end extending from the housing through the blade outlet, the blade having two sets of indicia imprinted thereon which correspond to units of measure, the first set of indicia including numbers imprinted along a first lengthwise edge portion of the blade and positioned on the blade such that the numbers are arranged in upright position one after the other and increase in value when read from the free end of the blade toward the fixed end of the blade, the second set of indicia including numbers imprinted along a second lengthwise edge portion of the blade and positioned on the blade such that the numbers are arranged in upside-down position one after the other, relative to the first set of numbers, and increase in value when read from the free end of the blade toward the fixed end of the blade, and a tab fixed to the free end of the blade, said tab having a bracket portion fixed to the free end of the blade and a planar hook portion formed from a contiguous piece of planar material, said hook portion extending in at least two directions transverse to a lengthwise edge of the blade at the free end of the blade, each hook portion including means for temporarily and removably hooking the free end of the blade to the first point, said tab including means for hooking the free end of the blade to the first point with the blade in horizontal position, said tab including means for hooking the free end of the blade to the first point with the blade in vertical position, the tab having tab portions extending in at least two directions transverse to the lengthwise edge of the blade at the free end of the blade with one of said directions extending sideways of the blade and one of said directions extending vertically of the blade, and with no tab portions extending beyond said and increase in value when read from the free end of the blade toward the fixed end of the blade, the second set of indicia including numbers imprinted along a second lengthwise edge portion of the blade and positioned on the blade such that the numbers are arranged in upside-down position one after the other, relative to the first set of numbers, and increase in value when read from the free end of the blade toward the fixed end of the blade, and a tab fixed to the free end of the blade, said tab having a bracket portion fixed to the free end of the blade and a planar hook portion formed from a contiguous piece of planar material, said hook portion extending in at least two directions transverse to a lengthwise edge of the blade at the free end of the blade, each hook portion including means for temporarily and removably hooking the free end of the blade to the first point, said tab including means for hooking the free end of the blade to the first point with the blade in horizontal position, said tab including means for hooking the free end of the blade to the first point with the blade in vertical position.

the tab having tab portions extending in at least two directions transverse to the lengthwise edge of the blade at the free end of the blade with one of said directions extending sideways of the blade and one of said directions extending vertically of the blade, and with no tab portions extending beyond said transverse tab portions, wherein one of the sets of numbers is legible right-side-up whether the free end of the blade is positioned at the first point or the second point.

2. The measuring tape recited in claim 1, the tab comprising a base fixed to said free end of the blade and an extension removably connected to the base, the extension having a slot into which the base is inserted for removable interconnection therewith, the extension extending in at least two directions transverse to a lengthwise edge of the blade at the free end of the blade.

3. The measuring tape recited in claim 2, the base comprising an "L-shaped" base, one portion of the base being coplanar with and attached to said reference end of said blade, the extension being "X-shaped" and extending upwardly, downwardly, and widthwise transverse to a lengthwise edge of the blade at the free end of the blade.

4. The measuring tape recited in claim 2, the base comprising an "L-shaped" base, one portion of the base being coplanar with and attached to the free end of the blade, said extension being a circular disc extending radially 360 degrees transverse to a lengthwise edge of the blade at the free end of the blade.

5. The tab extension recited in claim 1, said connecting portion of said tab extension having a slot into which the hook portion of the blade tab may be removably-inserted for connecting the blade tab and said tab extension.

\* \* \* \* \*

UNITED STATES PATENT AND TRADEMARK OFFICE
CERTIFICATE OF CORRECTION

PATENT NO. : 5,894,677  
DATED : April 20, 1999  
INVENTOR(S) : William H. Hoffman Page 1 of 1

It is certified that error appears in the above-identified patent and that said Letters Patent is hereby corrected as shown below:

<u>Claim 1, Column 8,</u>
Delete lines 6-36

Signed and Sealed this

Twenty-eighth Day of August, 2001

Attest:

NICHOLAS P. GODICI
*Attesting Officer*     *Acting Director of the United States Patent and Trademark Office*